Patented May 27, 1930

1,760,781

UNITED STATES PATENT OFFICE

WERNER SCHULEMANN, OF VOHWINKEL, NEAR ELBERFELD, AND FRITZ SCHÖNHÖFER AND AUGUST WINGLER, OF ELBERFELD, GERMANY, ASSIGNORS TO WINTHROP CHEMICAL COMPANY, INC., OF NEW YORK, N. Y., A CORPORATION OF NEW YORK

MANUFACTURE OF NEW PHARMACEUTICAL PRODUCTS

No Drawing. Application filed December 16, 1927, Serial No. 240,621, and in Germany December 20, 1926.

The present invention relates to compounds of the general formula:

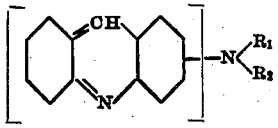

wherein the acridine nucleus may be further substituted and wherein $R_1$ represents hydrogen, an alkyl group, and aminoalkyl group or any other monovalent substituent, and $R_2$ represents an alkylene residue which is substituted by a heterocyclic residue containing nitrogen or by a hydro-aromatic residue which is substituted by a primary, secondary or tertiary amino group, and to a process of preparing these compounds.

We have found that these compounds are exceedingly valuable and effective new remedies for use in therapy.

The manufacture of our new compounds can be effected in several ways, for instance, by reacting upon a compound of the general formula

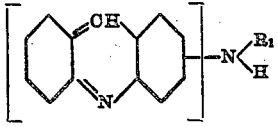

wherein the acridine nucleus may be further substituted and wherein $R_1$ represents hydrogen, an alkyl group, an aminoalkyl group or any other monovalent substituent with a compound of the general formula:

$$X \cdot R_2$$

wherein X represents halogen, $R_2$ represents an alkylene residue which is substituted by a heterocyclic residue containing nitrogen or by a hydro-aromatic residue which is substituted by a primary, secondary or tertiary amino-group.

Instead of the last mentioned compound, one may use a salt of this compound with an inorganic acid or a substitution product thereof, such as the bromo-ethyl-phthalimide compound; in the last case the phthalic acid is to be split off subsequently.

Example 1

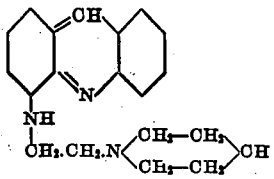

One molecule 4-amino-acridine and one molecule α-piperidylethylchloride (hydrochloric acid salt) are melted together during 7—8 hours at a temperature of 120–130° C. while stirring. The reaction mass is dissolved in diluted warm hydrochloric acid and filtered from a dark substance insoluble in hydrochloric acid. Our new compound is precipitated by alkali, filtered and dissolved in ether. After being dried with potash, the ether is distilled off. The new compound is distilled at a temperature of 220–225° C. under a pressure of 1 mm.; it is a golden-yellow, viscous oil, curdling at low temperature. Its hydrochloric salt is easily soluble in water with a wine-red color.

Example 2

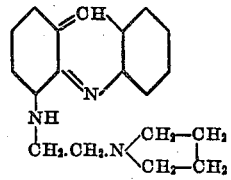

One molecule of 4-amino-acridine and one molecule of pyrolidylethyl-chloride (hydrochloric acid salt) are melted together for 8 hours at a temperature of 110–120° C. while stirring. The reaction mass is worked up as described in Example 1. The new compound is a viscous yellow oil, boiling at 215–220° C. under a pressure of 1 mm. Its hydrochloric salt is easily soluble in water with a wine-red color.

Example 3

One molecule 4-amino-acridine and 1 molecule of N-methyl-α-α'-tetramethyl-γ-brompiperidine (hydrobromic salt) are melted together for 12 hours at a temperature of 150–160° C. while stirring. The reaction mass is dissolved in diluted hydrochloric acid and filtered from a dark mass insoluble in diluted hydrochloric acid. Then a solution of sodium acetate is added, till the free hydrochloric acid has disappeared. The residue of the unchanged 4-amino-acridine precipitates and is separated by ether. From the aqueous solution our new compound is precipitated by caustic soda lye. By water-steam-distillation easily volatile amines which have formed as by-products in the melt are distilled off. The residue is extracted some time with ether. The ether is dried with potash and with ether, containing hydrochloric acid. The new acridine derivative is precipitated in form of its hydrochloric salt. It is a yellow mass easily soluble in water. It has the following formula:

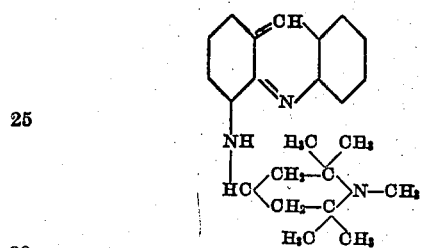

We claim:

1. As new products the compounds of the general formula:

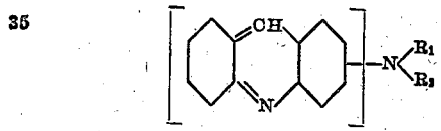

wherein the acridine nucleus may be further substituted and wherein $R_1$ represents hydrogen, an alkyl group, an amino-alkyl group or any other monovalent substituent and $R_2$ represents an alkylene residue which is substituted by a heterocyclic residue containing nitrogen by a hydro-aromatic residue which is substituted by a primary, secondary or tertiary amino group, being valuable therapeutical substances.

2. As new products the compounds of the general formula:

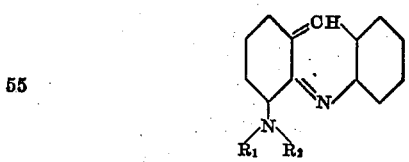

wherein the acridine nucleus may be further substituted and wherein $R_1$ represents hydrogen, an alkyl group, an amino-alkyl group or any other monovalent substituent and $R_2$ represents an alkylene residue which is substituted by a heterocyclic residue containing nitrogen or by a hydro-aromatic residue which is substituted by a primary, secondary or tertiary amino group, being valuable therapeutical substances.

3. As new products the compounds of the general formula:

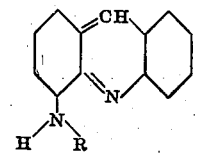

wherein R represents an alkylene residue which is substituted by a heterocyclic residue containing nitrogen, being valuable therapeutical substances.

4. As new products the compounds of the general formula:

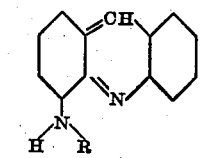

wherein R represents an ethylene residue which is substituted by a heterocyclic residue containing nitrogen, being valuable therapeutical substances.

5. As a new product the compound of the general formula:

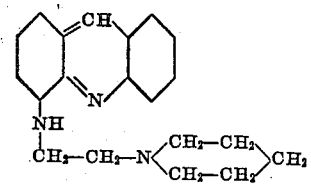

being a golden-yellow oil, boiling at a temperature of 220–225° C. under a pressure of 1 mm., curdling at a lower temperature, its hydrochloric salt being easily soluble in water with a wine-red color, and being a valuable pharmaceutical substance.

6. The process which comprises reacting upon a compound of the general formula:

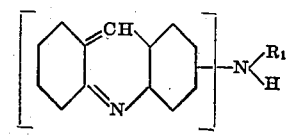

wherein the acridine residue may be further substituted and wherein $R_1$ represents hydrogen, an alkyl group, an aminoalkyl group or any other monovalent residue with a compound of the general formula $y.R_2$ wherein $y$ represents halogen and $R_2$ represents an alkylene residue which is substituted by a heterocyclic residue containing nitrogen or a hydro-aromatic residue which is substituted by primary, secondary or tertiary amino group.

7. The process of producing a compound of the formula:
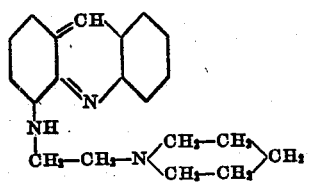
which process comprises reacting upon 4-amino-acridine with the hydrochloric salt of α-piperidyl-ethylchloride.
In testimony whereof we have hereunto set our hands.
WERNER SCHULEMANN.
FRITZ SCHÖNHÖFER.
AUGUST WINGLER.